United States Patent
Masuda et al.

(10) Patent No.: US 11,222,752 B2
(45) Date of Patent: Jan. 11, 2022

(54) CERAMIC ELECTRONIC DEVICE

(71) Applicant: TDK CORPORATION, Tokyo (JP)

(72) Inventors: Akihiro Masuda, Tokyo (JP); Norihisa Ando, Tokyo (JP); Shinya Ito, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/063,106

(22) Filed: Oct. 5, 2020

(65) Prior Publication Data
US 2021/0125782 A1     Apr. 29, 2021

(30) Foreign Application Priority Data
Oct. 28, 2019   (JP) .............................. JP2019-195220

(51) Int. Cl.
*H01G 4/248*     (2006.01)
*H01G 4/232*     (2006.01)

(52) U.S. Cl.
CPC ............. *H01G 4/248* (2013.01); *H01G 4/232* (2013.01); *H01G 4/2325* (2013.01)

(58) Field of Classification Search
CPC ....... H01G 4/248; H01G 4/232; H01G 4/2325
See application file for complete search history.

(56) References Cited

U.S. PATENT DOCUMENTS

| | | | | |
|---|---|---|---|---|
| 5,839,178 A * | 11/1998 | Yoshida | ............... | H03H 9/0547 29/25.35 |
| 6,087,763 A * | 7/2000 | Kim | ............... | H03H 9/0547 310/348 |
| 8,873,219 B2 * | 10/2014 | Perea | ............... | H01C 1/14 361/303 |
| 8,988,857 B2 * | 3/2015 | McConnell | ............. | H01G 4/38 361/308.1 |
| 9,805,872 B2 * | 10/2017 | Miller | ............... | H01G 4/232 |
| 10,573,459 B2 * | 2/2020 | Akiyoshi | ............... | H01G 4/30 |
| 2001/0009343 A1 * | 7/2001 | Sawai | ............... | H03H 9/177 310/320 |
| 2005/0140250 A1 * | 6/2005 | Takahashi | ............. | H01G 4/248 310/365 |
| 2014/0055910 A1 * | 2/2014 | Masuda | ............... | H01G 4/38 361/303 |

(Continued)

FOREIGN PATENT DOCUMENTS

JP     S61-234519 A     10/1986

*Primary Examiner* — Dion R. Ferguson
(74) *Attorney, Agent, or Firm* — Oliff PLC

(57) ABSTRACT

A ceramic electronic device includes a ceramic element body, a terminal electrode, and a lead terminal. The ceramic element body has an end surface and a lateral surface. The terminal electrode is formed on from the end surface to a part of the lateral surface of the ceramic element body. The lead terminal is connected to the terminal electrode by a connection member. The lead terminal includes an electrode facing portion disposed correspondingly to an end-surface electrode of the terminal electrode, an extension portion extending downward from a lower end of the electrode facing portion, and a step surface located between the electrode facing portion and the extension portion. The electrode facing portion has a first recess facing the terminal electrode. A part of the first recess reaches the step surface. Another part of the first recess is open outside the lead terminal.

12 Claims, 16 Drawing Sheets

(56) References Cited

U.S. PATENT DOCUMENTS

| | | | |
|---|---|---|---|
| 2014/0240081 A1* | 8/2014 | Murowaki | H01H 85/201 |
| | | | 337/208 |
| 2017/0169956 A1* | 6/2017 | Miller | H01G 4/40 |
| 2018/0286584 A1* | 10/2018 | Ando | H01G 4/1227 |
| 2019/0069411 A1* | 2/2019 | Park | H01G 4/40 |
| 2021/0090805 A1* | 3/2021 | Masuda | H01G 4/30 |
| 2021/0125781 A1* | 4/2021 | Masuda | H01G 4/232 |

* cited by examiner

CERAMIC ELECTRONIC DEVICE

BACKGROUND OF THE INVENTION

The present invention relates to a ceramic electronic device having a lead terminal.

As an electronic component mounted on a circuit board or so, a ceramic electronic device having a lead terminal as shown in Patent Document 1 is known. In the ceramic electronic device, it is normal to join lead terminals to a ceramic element body on which a terminal electrode is formed using solder. Specifically, as disclosed in Patent Document 1, the lead terminals are soldered in such a manner that the ceramic element body is interposed by a pair of lead terminals, and they are immersed into a solder bath with that state.

At this time, a fillet is formed between the lead terminal and the terminal electrode due to wet spread of solder. At an end of the ceramic element body in contact with the fillet, cracks are likely to occur inside the element body due to, for example, generation of shrinkage stress during solidification of solder. If cracks occur inside the element body, characteristics, such as moisture resistance and mechanical strength, as an electronic device deteriorate, and this is a problem.

Patent Document 1: JPS61234519 (A)

BRIEF SUMMARY OF INVENTION

The present invention has been achieved under such circumstances. It is an object of the invention to provide a ceramic electronic device having fewer cracks generated in a ceramic element body.

To achieve the above object, a ceramic electronic device according to the first aspect of the present invention includes:

a ceramic element body having an end surface and a lateral surface;

a terminal electrode formed on from the end surface to a part of the lateral surface of the ceramic element body; and a lead terminal connected to the terminal electrode by a connection member, wherein the lead terminal includes:

an electrode facing portion disposed correspondingly to an end-surface electrode of the terminal electrode;

an extension portion extending downward from a lower end of the electrode facing portion; and a step surface located between the electrode facing portion and the extension portion, the electrode facing portion has a first recess facing the terminal electrode;

a part of the first recess reaches the step surface; and another part of the first recess is open outside the lead terminal.

A ceramic electronic device according to the second aspect of the present invention includes:

a ceramic electronic body having two end surfaces opposing each other and a lateral surface connecting the two end surfaces;

a pair of terminal electrodes formed respectively on the two end surfaces; and a first lead terminal and a second lead terminal respectively connected to the pair of terminal electrodes, wherein each of the first lead terminal and the second lead terminal includes:

an electrode facing portion disposed correspondingly to an end-surface electrode of the terminal electrode;

an extension portion extending downward from a lower end of the electrode facing portion; and a step surface located between the electrode facing portion and the extension portion, each of the electrode facing portions has a first recess facing the terminal electrode, a part of the first recess reaches the step surface, and another part of the first recess is open outside the lead terminal.

The ceramic electronic devices (both of the first aspect and the second aspect) according to the present invention have the above-mentioned structure and can thereby have a small size of a fillet of a connection member, such as solder, formed between the lateral surface of the ceramic element body and the lead terminal. In particular, an angle of the fillet to the lateral surface of the ceramic element body can be small (acute angle). As a result, the ceramic electronic devices according to the present invention can restrain generation of cracks inside the ceramic element body by the effect of the fillet.

The reason why the angle of the fillet can be small is, for example, conceivable as below. In the ceramic electronic devices according to the present invention, the lead terminal and the terminal electrode are joined by solder (connection member), and a molten solder flows between the first recess and the end surface of the terminal electrode at the time of connection and is hard to remain between the lateral surface of the terminal electrode and the lead terminal. That is, the first recess functions as a passage where the solder flows at the time of soldering. In the ceramic electronic devices according to the present invention, it is consequently considered that the angle of the solder fillet is small between the lateral surface of the ceramic element body and the lead terminal.

In the ceramic electronic devices according to the present invention, since the step surfaces are formed on the lead terminals, the ceramic element body can be joined while being temporarily held at a predetermined location of the lead terminals, and the soldering is easily carried out. That is, the lead terminals and the ceramic element body are easily positioned at the time of soldering, and the ceramic electronic devices according to the present invention are suitable for mass production.

In the ceramic electronic device according to the present invention, an upper end of the electrode facing portion is inclined toward the terminal electrode, the electrode facing portion has at least one inclined surface, and the inclined surface constitutes the first recess. Instead, the electrode facing portion has a facing surface facing the end-surface electrode of the terminal electrode, and the first recess is formed on the facing surface. In the present invention, the recess can have the above-mentioned structure.

Preferably, a second recess extending in a direction intersecting the first recess is further formed on the electrode facing portion, and the first recess and the second recess are communicated with each other. When a plurality of passages where the solder flows is formed, the fillet angle can be smaller. As a result, the ceramic electronic devices according to the present invention can more advantageously restrain cracks generated inside the ceramic element body.

Preferably, a third recess is formed on the step surface, and the first recess and the third recess of the step surface are communicated with each other. When the recess is also formed on the step surface, the solder is easy to flow toward the first recess at the time of soldering, and the fillet angle can be smaller. As a result, the ceramic electronic devices according to the present invention can more advantageously restrain cracks generated inside the ceramic element body.

Preferably, another part of the first recess is open outside at a lateral edge of the electrode facing portion. In this structure, a passage where the solder flows is formed outside the electrode facing portion at the time of soldering, and the fillet angle can be smaller. As a result, the ceramic electronic devices according to the present invention can more advantageously restrain cracks generated inside the ceramic element body.

Preferably, the extension portion of the lead terminal has a bent portion bending outward from below the step surface. When the bent portion is formed in this manner, the fillet angle to the lateral surface of the ceramic element body can be smaller.

Preferably, the connection member is a solder, and an alloy layer containing copper and tin is formed on a surface of the lead terminal contacted with the solder. When the alloy layer is formed, the surface solder wettability is favorable at a portion of the lead terminal contacted with the solder. As a result, the ceramic electronic devices according to the present invention can have a smaller fillet angle and more advantageously restrain cracks generated inside the ceramic element body.

Incidentally, the fillet preferably has an angle of 40 degrees or less (more preferably, 35 degrees or less). When the angle of the fillet is controlled within the above range, cracks generated in the ceramic element body can more advantageously be restrained.

In the second aspect of the present invention, the electrode facing portions of the first lead terminal and the second lead terminal may have different shapes.

In the second aspect of the present invention, a gap between the step surface of the first lead terminal and the lateral surface of the ceramic element body may be wider than that between the step surface of the second lead terminal and the lateral surface of the ceramic element body.

DETAILED DESCRIPTION OF INVENTION

Hereinafter, the present invention is explained based on embodiments shown in the figures, but the present invention is not limited to the following embodiments.

First Embodiment

Figure 1:
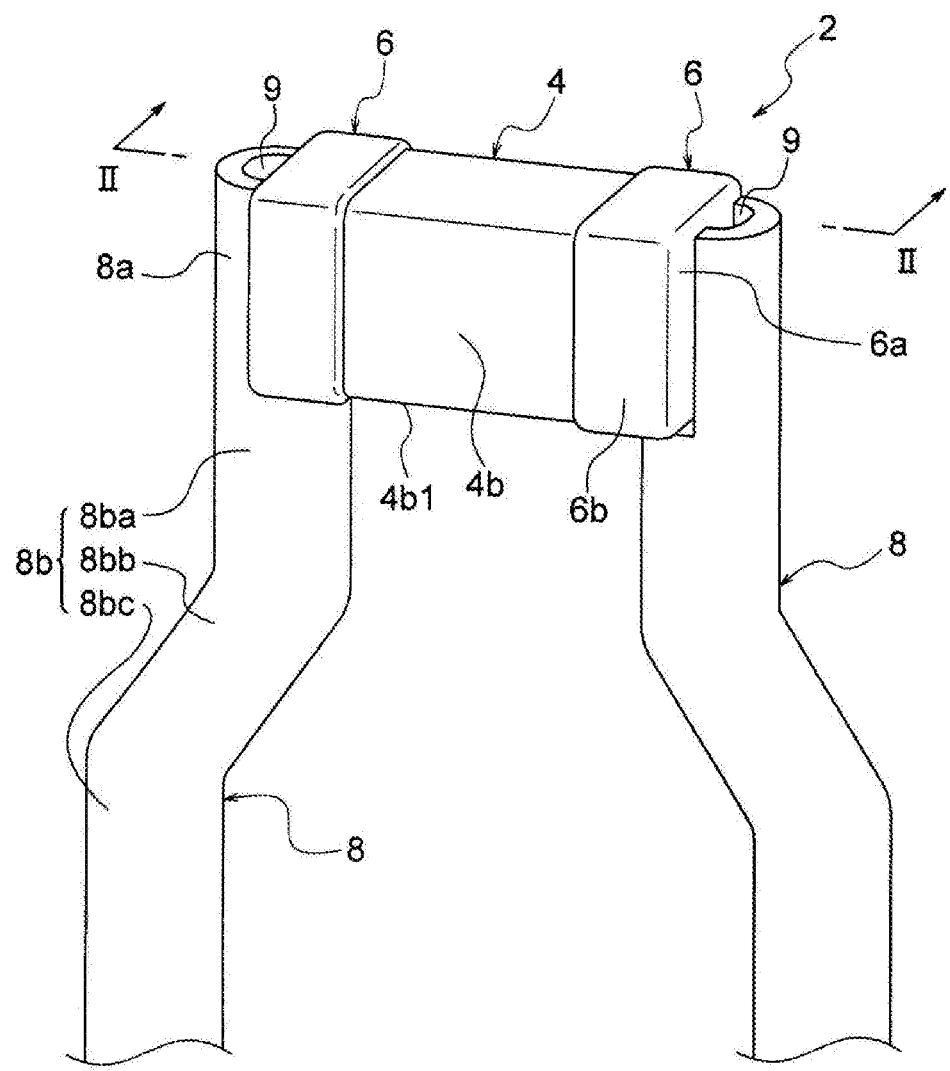
FIG. 1 is a brief perspective view of a ceramic electronic device according to an embodiment of the present invention.
Figure 2A:
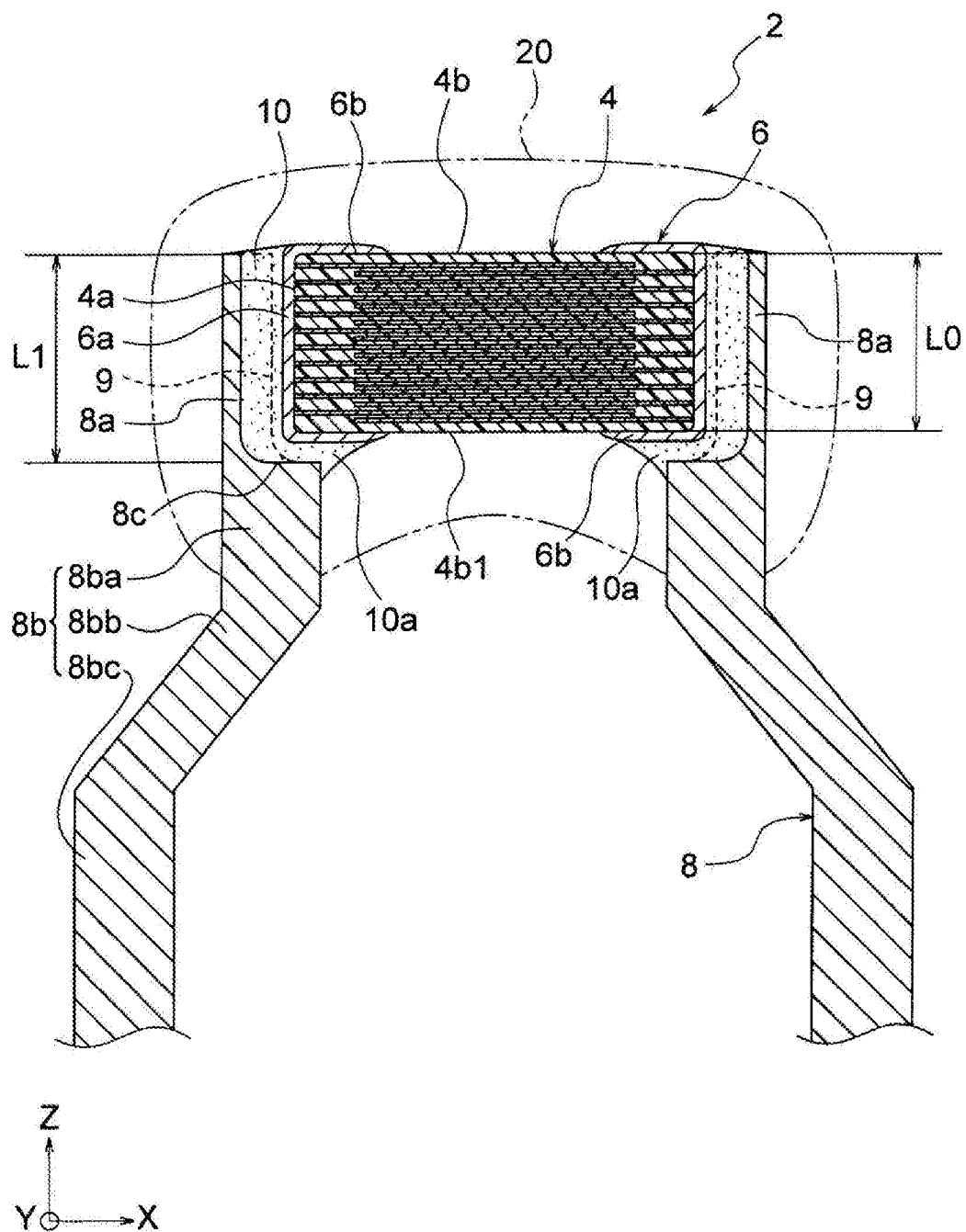
FIG. 2A is a cross-sectional view along the II-II line shown in FIG. 1.

As shown in FIG. 1 and FIG. 2A, a ceramic electronic device 2 with lead terminals according to an embodiment of the present invention includes a ceramic element body 4 and a pair of lead terminals 8. As an example of ceramic electronic devices, the present embodiment explains a case where the ceramic element body 4 is structured by a multilayer ceramic capacitor.

As shown in FIG. 2A, the whole of the ceramic element body 4 and a part of the lead terminals 8 are covered with an exterior 20 shown by two-dot chain line. The cover range of the exterior 20 is not limited, but the exterior 20 covers at least the whole of the ceramic element body 4 and connection parts between the ceramic element body 4 and the lead terminals 8 (i.e., parts where a solder 10 mentioned below exists). The exterior 20 is made of any insulating material, but is preferably made of a halogen-free insulating resin, such as thermosetting resin (e.g. epoxy resin).

The ceramic element body 4 shown in FIG. 1 and FIG. 2A includes two end surfaces $4a$ facing each other in the X-axis direction and four lateral surfaces $4b$ connecting the two end surfaces $4a$. In the present embodiment, among the four lateral surfaces $4b$, a surface perpendicular to the Z-axis and located below in the Z-axis direction is referred to as a bottom surface $4b1$. The size of the ceramic element body 4 is not limited and is appropriately determined based on purpose or usage. For example, the size of the ceramic element body 4 is: a length in the X-axis direction of 0.6-6.5 mm; a width in the Y-axis direction of 0.3-5.0 mm; and a height in the Z-axis direction (L0 shown in FIG. 2A) of 0.2-3.5 mm. In the figures, the X-axis, the Y-axis, and the Z-axis are perpendicular to each other.

In the inside of the ceramic element body 4, internal electrode layers 16 and 18 are laminated alternately via ceramic layers 14. The internal electrode layers 16 are exposed to the end surface $4a$ on one side of the ceramic element body 4 in the X-axis direction, and the internal electrode layers 18 are exposed to the end surface $4a$ on the other side of the ceramic element body 4 in the X-axis direction.

A pair of terminal electrodes 6 is formed on both ends of the ceramic element body 4 in the X-axis direction. Specifically, each of the terminal electrodes 6 is formed to surround the end surface $4a$ and a part of the lateral surfaces $4b$ of the ceramic element body 4 and includes an end-surface electrode $6a$ and a lateral-surface electrode $6b$. Each of the internal electrode layers 16 and 18 is electrically connected to the end-surface electrode $6a$ on each of the exposed end surfaces $4a$. Incidentally, the pair of terminal electrodes 6 is insulated with each other, and a capacitor circuit is structured by the pair of terminal electrodes 6 and the internal electrode layers 16 and 18.

In the present embodiment, the ceramic layers 14 are composed of a dielectric composition. The dielectric composition to be used is not limited and is a known material. For example, barium titanate ($BaTiO_3$), calcium titanate ($CaTiO_3$), strontium titanate ($SrTiO_3$), calcium zirconate ($CaZrO_3$), potassium niobate ($KNbO_3$), etc. can be used as a main component. In addition to the main component, rare earth oxides, alkaline earth metal oxides, transition metal oxides, magnesium oxide, etc. may be added as a subcomponent. Incidentally, the thickness and lamination number of the ceramic layers 14 are not limited either, but can be normal thickness and lamination number.

The internal electrode layers 16 and 18 contain a conductive metal as a main component. The conductive metal to be used is not limited and is a known material, such as nickel, copper, silver, gold, palladium, and an alloy containing at least one of these metals. The thickness of the internal electrode layers 16 and 18 is not limited either and is a normal thickness. The lamination number of internal electrode layers 16 and 18 is determined based on the lamination number of the ceramic layers 14.

The terminal electrodes 6 also contain a conductive metal as a main component and is made of any material. As the terminal electrodes 6, copper, copper alloy, nickel, nickel alloy, or the like is normally used, but silver, alloy of silver and palladium, etc. can also be used. The thickness of the terminal electrodes 6 is not limited, but is normally about 10-50 µm. Incidentally, a plating layer made of at least one type selected from nickel, copper, tin, etc. may be formed on the surfaces of the terminal electrodes 6. The thickness of each plating layer on the terminal electrodes 6 is preferably 1-10 µm. The plating layer may have a multilayer structure.

In the present embodiment, as shown in FIG. 2A, the pair of lead terminals 8 is disposed correspondingly to the two end surfaces 4a of the ceramic element body 4. Each of the lead terminals 8 extends in the Z-axis direction and includes an electrode facing portion 8a, an extension portion 8b, and a step surface 8c. In the present embodiment, the components of the lead terminals 8 are integrally formed by processing a conductive metal wire, but the lead terminals 8 may be formed by processing a conductive metal plate.

As the conductive wire constituting the lead terminals 8, a metal wire containing copper (Cu), nickel (Ni), iron (Fe), silver (Ag), etc. can be used. In particular, the lead terminals 8 preferably contain copper. Specifically, it is preferable to use a copper based metal wire whose core member is pure copper or copper alloy containing copper as a main component (hereinafter, referred to as Cu wire). Instead, it is preferable to use a copper coated steel wire on which a copper plating layer is formed (hereinafter, referred to as CP wire). In case of CP wire, the core member is pure iron or iron alloy containing iron as a main component. In case of CP wire, the thickness of the copper plating layer formed on the surface of the core member is preferably 5 µm to 10 µm.

Incidentally, the wire size of the conductive wire constituting the lead terminals 8 is appropriately determined based on the size of the ceramic element body 4. For example, the wire size can be 0.5 mm to 1.0 mm and is preferably 0.5 mm to 0.6 mm.

Next, each component of the lead terminals 8 is explained in detail. As shown in FIG. 2A, the tips of the lead terminals 8 (upper side in the Z-axis direction) are the electrode facing portions 8a. The electrode facing portions 8a are arranged to face the end-surface electrodes 6a of the terminal electrodes 6 and are joined with the end-surface electrodes 6a via a solder 10. That is, the electrode facing portions 8a are substantially parallel to the end-surface electrodes 6a of the terminal electrodes 6.

The length L1 of the electrode facing portions 8a in the longitudinal direction (Z-axis direction) may be larger or smaller than the height L0 of the ceramic element body 4 in the Z-axis direction, but is preferably about 0.9-1.1 times as large as the height L0 of the ceramic element body 4 in the Z-axis direction. Due to such a range, the connection strength between the terminal electrodes 6 and the lead terminals 8 tends to improve.

Preferably, the width (W5) of the electrode facing portions 8a in the Y-axis direction is about 0.7-1.1 times as large as the width of the ceramic element body 4 in the Y-axis direction. When the width of the electrode facing portions 8a is within the above-mentioned range, the amount of the solder 10 entering between the end-surface electrodes 6a and the electrode facing portions 8a can be controlled to an appropriate range.

Figure 3A:
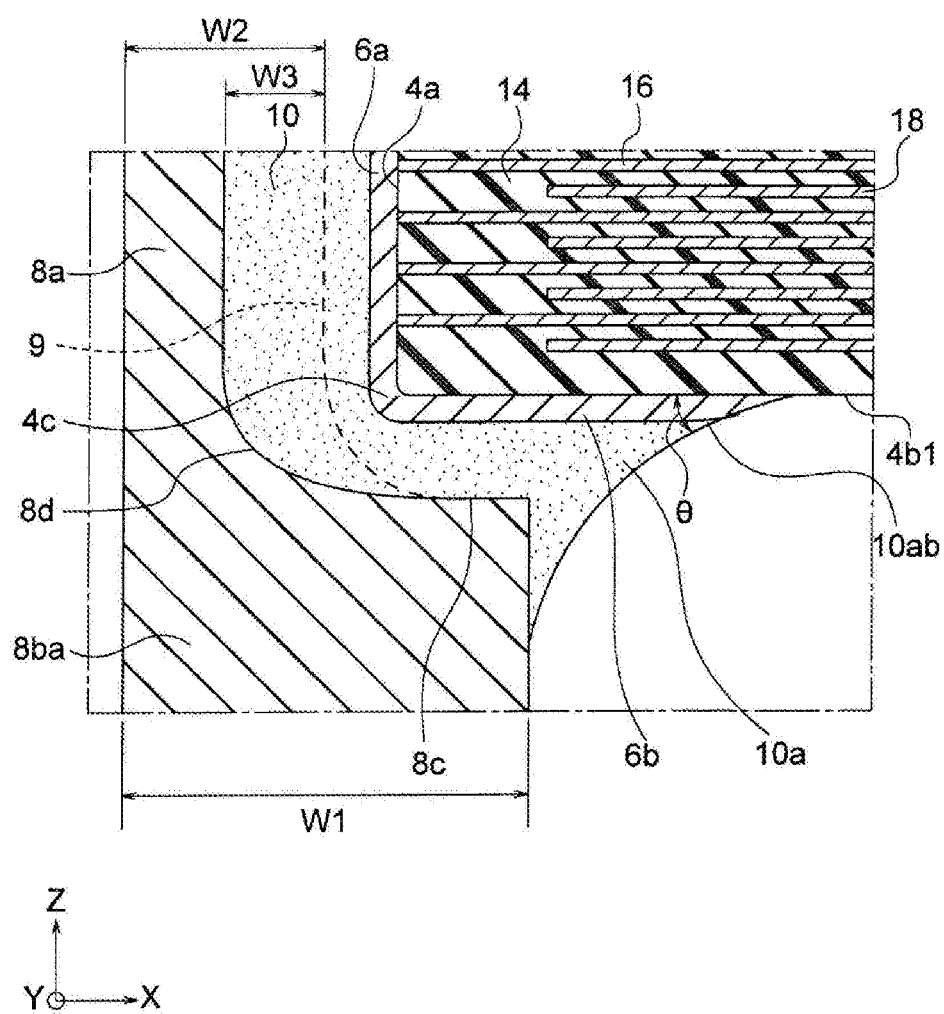
FIG. 3A is an enlarged cross-sectional view of a main part of FIG. 2A.

In the present embodiment, the electrode facing portions 8a are formed by squeezing only the tips of the conductive wires. The step surfaces 8c are formed at the lower ends of the electrode facing portions 8a (i.e., between the electrode facing portions 8a and the extension portions 8b) by squeezing. Then, the width (W2) of the electrode facing portions 8a in the X-axis direction is smaller than the width (W1) of the extension portions 8b, which are not squeezed, in the X-axis direction. Specifically, the width W2 of the electrode facing portions 8a in the X-axis direction is preferably about ½-⅞10 of the width W1 of the extension portions 8b in the X-axis direction. Incidentally, as shown in FIG. 3A, the width W2 of the electrode facing portions 8a is a width including a depth (W3) of a recess 9 mentioned below. The width W1 of the extension portions 8b means a maximum width in the X-axis direction and is the same as a diameter of the extension portions 8b.

Figure 4A:
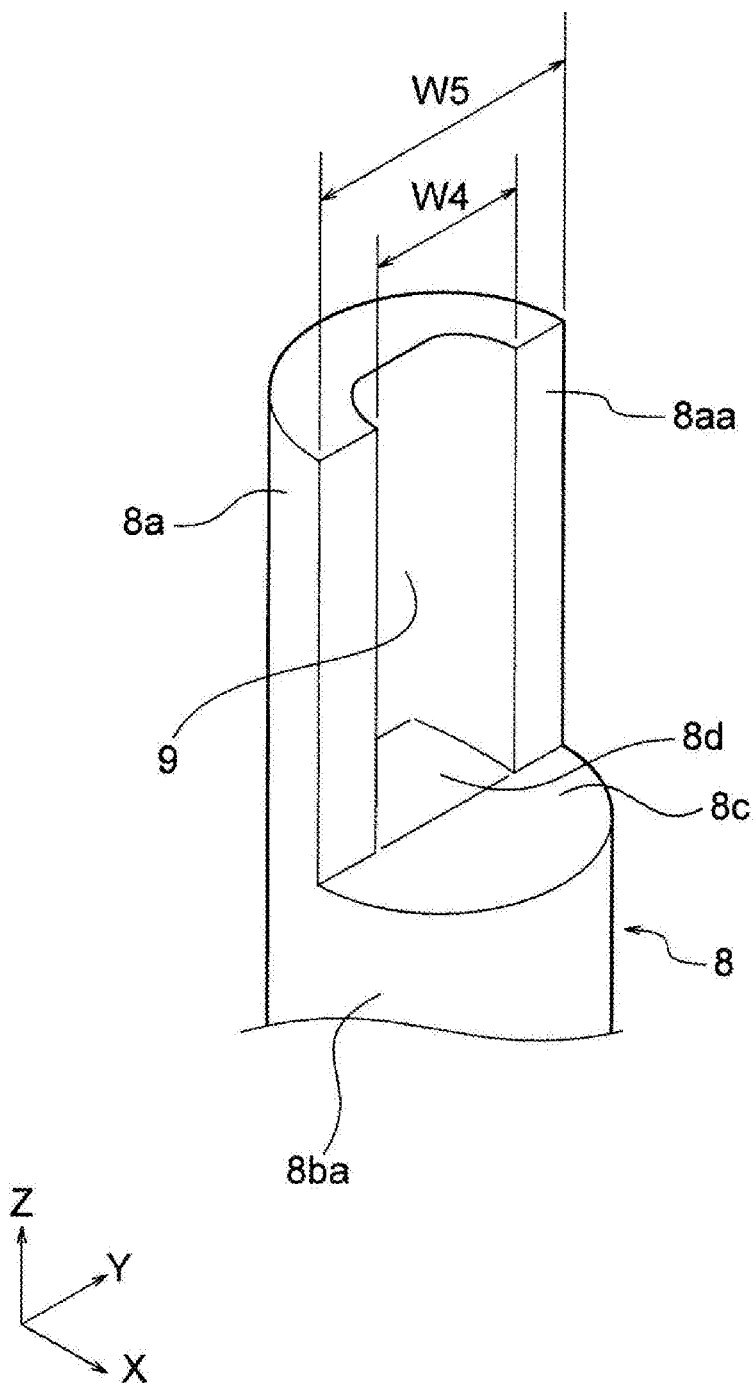
FIG. 4A is a schematic perspective view illustrating a tip shape of a lead terminal according to an embodiment of the present invention.

Moreover, as shown in FIG. 4A, each of the electrode facing portions 8a includes a facing surface 8aa formed by squeezing, and the facing surfaces 8aa are arranged to face the end surfaces 4a of the ceramic element body 4a after the assembled state. Then, the facing surface 8aa has a recess 9 dented toward the direction of decreasing thickness. The direction of decreasing thickness means a direction away from the end-surface electrodes 6a of the terminal electrodes 6.

The recess 9 extends in a parallel direction to the Z-axis (i.e., a perpendicular direction to the Y-axis) and continuously exists from the tip to the lower end of each of the electrode facing portions 8a. That is, one end of the recess 9 reaches the step surface 8c, and the other end of the recess 9 is open outside the electrode facing portion 8a at the tip of each of the electrode facing portions 8a. Incidentally, the recess 9 is formed using a die having a projection at the time of squeezing. The inner surface of the recess 9 is curved in arc shape, but is not necessarily curved in arc shape and may be provided with a corner.

In the present embodiment, the width (W4) of the recess 9 in the Y-axis direction shown in FIG. 4A is preferably ⅕-⅗ of the width (W5) of the electrode facing portions 8a in the Y-axis direction, and the depth (W3) of the recess 9 shown in FIG. 3A is preferably ⅕-½ of the width (W2) of the electrode facing portions 8a in the X-axis direction. Incidentally, FIG. 3A illustrates an X-Z cross section when the ceramic electronic device 2 is cut at a substantially central location in the Y-axis direction, and all of W3-W5 are a maximum width or depth in each direction.

Next, explained are components other than the electrode facing portions 8a of the lead terminals 8. Each of the lead terminals 8 includes the extension portion 8b extending along the Z-axis direction below the electrode facing portion 8a in the Z-axis direction. As mentioned above, since the electrode facing portions 8a are formed by squeezing, the step surfaces 8c are formed between the electrode facing portions 8a and the extension portions 8b. Incidentally, the X-Y cross section of the extension portions 8b is not squeezed and thereby has a circular shape.

As shown in FIG. 2A, each of the extension portion 8b of the lead terminals 8 is structured by an upper support portion 8ba, a lower support portion 8bb, and a leg portion 8bc, and the parts of each of the extension portion 8b are integrally continuous. The upper support portion 8ba extends downward in the Z-axis direction from the step surface 8c substantially in parallel to the Z-axis. On the other hand, the lower support portion 8bb bends toward a direction where the pair of lead terminals 8 is away from each other in the X-axis direction. The upper support portion 8ba and the lower support portion 8bb have a role in supporting the body of the electronic device on a board after the electronic device is mounted on the board. Moreover, the lower support portion 8bb functions as a kink for regulating a standing height at the time of mounting the ceramic electronic device 2 on the board.

The leg portion 8bc is integrally formed below the lower support portion 8bb in the Z-axis direction and extends linearly substantially in parallel to the Z-axis. The leg portion 8bc is connected to a board, such as printed board and flexible board, and constitutes a board mounting portion. The ceramic electronic device 2 is mounted on a board in any manner, such as soldering, welding, and caulking.

Next, the connection state between the lead terminals 8 and the ceramic element body 4 is explained based on FIG. 3A. The lead terminals 8 are joined with the terminal electrodes 6 of the ceramic element body 4 by the solder 10. The solder 10 is made of any material, such as lead-free solder (e.g., tin-antimony, tin-silver-copper, tin-copper, tin-bismuth).

In the present embodiment, as shown in FIG. 3A, the solder 10 exists between the end-surface electrode 6a and the electrode facing portion 8a and between the lateral-surface electrode 6b and the step surface 8c. Then, a fillet 10a of the solder is formed between the lateral-surface electrode 6b and the upper support portion 8ba (i.e., between the bottom surface 4b1 of the ceramic element body 4 and the lead terminal 8). That is, the lead terminals 8 are contacted with the solder 10 at the electrode facing portion 8a, the step surface 8c, and a part of the upper support portion 8ba.

In the present embodiment, since the recess 9 reaches the step surface 8c, the recess 9 functions as a passage where the solder flows at the time of soldering. After solder bonding, the solder thereby exists more between the electrode facing portion 8a and the end-surface electrode 6a than between the lateral-surface electrode 6b and the step surface 8c (or between the lateral-surface electrode 6b and the upper support portion 8ba). This reduces the angle θ of the fillet 10a in the ceramic electronic device 2 according to the present embodiment.

Here, the angle θ of the fillet 10a means an angle formed by the bottom surface 4b1 of the ceramic element body 4 and an outer periphery 10ab of the fillet 10a on the X-Z cross section shown in FIG. 3A. Incidentally, the X-Z cross section shown in FIG. 3A is a cross section obtained by cutting the ceramic electronic device 2 at a substantially central location of the lead terminals 8 in the Y-axis direction.

Due to the shrinkage stress during solidification of the solder, cracks are normally easily generated in the surroundings of the fillet of the ceramic element body. Even after the solder is solidified, the internal stresses are accumulated in the fillet, and cracks are thereby easily generated in the surroundings of the fillet if an external force applies to the lead terminals. In the present embodiment, since the angle θ of the fillet 10a can be small (acute angle), it is possible to effectively prevent the generation of cracks in the surroundings of the fillet 10a of the ceramic element body 4.

The reason why the angle θ of the fillet 10a can be small is, for example, conceivable as below. In the present embodiment, since the recess 9 functions as a passage where the solder flows, a molten solder flows between the recess 9 and the end-surface electrode 6a at the time of soldering the lead terminals 8 and the terminal electrodes 6 and is hard to remain between the lateral-surface electrode 6b and the lead terminals 8. That is, the molten solder existing between the lateral-surface electrode 6b and the lead terminals 8 (i.e., the location of the fillet 10a) moves toward the recess 9 at the time of solder solidification. In the present embodiment, it is consequently considered that the angle θ of the fillet 10a is small between the bottom surface 4b1 of the ceramic element body 4 and the lead terminals 8.

As shown in FIG. 3A, an outer corner 4c formed between the end surface 4a and the bottom surface 4b1 of the ceramic element body 4 is round on the X-Z cross section. Likewise, an inner corner 8d formed between the facing surface 8aa and the step surface 8c of the lead terminals 8 is round. In the present embodiment, the radius of curvature of the inner corner 8d is preferably larger than that of the outer corner 4c. This structure allows the solder 10 to easily remain between the recess 9 and the end-surface electrode 6a. As a result, the angle θ of the fillet 10a becomes smaller.

Although not illustrated in FIG. 3A, a cover layer is preferably formed on the surfaces of the lead terminals 8 contacted with the solder 10. The cover layer is preferably made of a component whose solder wettability is better than that of the core member of the lead terminals 8. Preferably, the cover layer is specifically an alloy layer containing copper and tin (more specifically, an alloy layer containing $Cu_6Sn_5$).

The thickness of the cover layer is uneven to some degree, but can be about 0.5 μm to 10.0 μm. Preferably, the thickness of the cover layer is 1.0 μm to 7.0 μm (more preferably, 1.0 μm to 3.0 μm). Incidentally, the thickness of the cover layer can be measured by cross-sectional observation with scanning electron microscope (SEM) or so, and the component of the cover layer can be confirmed by electron probe microanalyzer (EPMA), electron diffraction, or the like.

The angle θ of the fillet 10a changes depending upon, for example, the configuration of the lead terminals 8 (including the formation location and size of the recess 9) and the surface state of the lead terminals 8, the terminal electrodes 6, or the like. In the present embodiment, the angle θ of the fillet 10a is preferably 5 degrees or more and less than 40 degrees and is more preferably less than 35 degrees. When the angle θ of the fillet 10a is controlled within the above range, cracks generated in the ceramic element body 4 can more advantageously be restrained.

Incidentally, the angle θ of the fillet 10a is measured by photographing a cross-sectional picture of the X-Z cross section shown in FIG. 3A with SEM or optical microscope and subjecting the cross-sectional picture to image analysis.

At this time, a sample for observation is obtained by cutting the ceramic electronic device 2 so that the X-Z cross section is located at a substantial center of the lead terminals 8 in the Y-axis direction and subjecting the X-Z cross section to mirror polishing.

Next, a method of manufacturing the ceramic electronic device 2 is explained below.

A capacitor chip is initially prepared as the ceramic element body 4. The capacitor chip is manufactured by a known method. For example, the capacitor chip is manufactured by laminating green sheets on which an electrode pattern is formed with doctor blade, screen printing, or the like to obtain a laminated body and thereafter pressing and firing the laminated body.

Next, a pair of terminal electrodes 6 is formed on the prepared capacitor chip. The terminal electrodes 6 are formed in any manner and can be formed by, for example, immersing the capacitor chip into a conductive paste for electrodes and thereafter firing the conductive paste. If necessary, the surface of the fired electrode may be plated. For example, the terminal electrodes 6 can have a multilayer structure of Cu fired layer/Ni plated layer/Sn plated layer.

Next, a method of manufacturing the lead terminals 8 is explained. In the manufacture of the lead terminals 8, a conductive wire is initially prepared. In the present embodiment, the conductive wire to be prepared is preferably a Cu wire where a tin plating layer is formed on the surface or a CP wire where a tin plating layer is further formed on the surface of the Cu plating layer. Here, the tin plating layer formed on the surface of the Cu wire or the CP wire preferably contains tin by 90 mol % or more and preferably has a thickness of 1 μm to 10 μm.

Instead of the tin plating layer, however, a silver plating layer, a gold plating layer, a palladium plating layer, copper-tin plating layer, etc. may be formed on the surface of the conductive wire. When a gold plating layer or a palladium plating layer is formed, a nickel plating layer may be formed on the base.

The prepared conductive wire is cut into a predetermined length and bent to have a U shape as a whole. Then, the U-shaped conductive wire is attached and fixed to a carrier tape. At this time, the conductive wire is fixed so that both ends of the U shape protrude from the carrier tape.

The tip of the conductive wire is processed into the shape shown in FIG. 4A while the conductive wire is being attached to the carrier tape. Specifically, both ends of the conductive wire are initially bent to form the upper support portion 8ba and the lower support portion 8bb. After that, the tip of the conductive wire is squeezed (pressed) to form the electrode facing portion 8a. Incidentally, the order of bending and squeezing may be reversed. In mass production, a plurality of conductive wires is attached to the carrier tape, and the above-mentioned tip processing is carried out at the same time.

Next, the ceramic element body 4 and the lead terminals 8 manufactured in the above-mentioned manner are joined to obtain the ceramic electronic device 2 with the lead terminals. For example, when an alloy layer containing copper and tin with a good solder wettability is formed on the surface of the lead terminals 8 (in particular, the portion contacted with the solder), the lead terminals 8 are joined to the ceramic element body 4 in the following manner.

First, only the tips of the lead terminals 8 joined on the carrier tape are immersed into a solder bath to form an alloy layer containing copper and tin on the surface of the lead terminals 8 (an immersion step of the lead terminals 8).

In the above-mentioned immersion step, the type of the solder bath to be used may be the same as or different from the solder bath to be used in a soldering step of the ceramic element body 4 mentioned below. The temperature of the solder bath to be used varies depending upon the composition of the solder, but is, for example, 270° C. to 320° C. in case of a tin-antimony based solder. In particular, the temperature of the solder bath in the immersion step is preferably about 0.9-1.1 times as large as that in the soldering step mentioned below.

The immersion time into the solder bath in the immersion step is preferably about 10-60 times as long as that in the following soldering step and is specifically preferably about 10-60 seconds.

In the above-mentioned immersion step, at portions immersed into the solder bath, the tin plating layer formed on the surface of the conductive wire is dissolved in the solder bath to generate an alloy layer containing copper and tin. The tin plating layer remains on the surface of the leg portion 8bc, the lower support portion 8bb, and a part of the upper support portion 8ba. That is, the tin plating layer remains on the surface of the lead terminals 8 not immersed into the solder bath.

After the immersion step, the ceramic element body 4 with the terminal electrodes 6 is temporarily fixed by disposing the ceramic element body 4 between the electrode facing portion 8a of the pair of lead terminals 8 and sandwiching the ceramic element body 4 by the pair of electrode facing portions 8a.

Next, the tips of the lead terminals 8 to which the ceramic element body 4 is temporarily fixed is immersed into the solder bath to solder the terminal electrodes 6 and the lead terminals 8 (soldering step). In the soldering step, the immersion time into the solder bath is about 0.5-2 seconds and is preferably as short as 0.8-1.5 seconds. When the immersion time into the solder bath is within the above range, the thermal effect on the ceramic element body 4 can be minimized.

After the soldering step, the tips of the lead terminals 8 to which the ceramic element body 4 is joined are immersed into a liquid insulating resin bath. At this time, at least the solder joint portion between the ceramic element body 4 and the lead terminals 8 is immersed into the insulating resin bath. After that, the exterior 20 is formed to cover the ceramic element body 4 and a part of the lead terminals 8 by appropriately carrying out a heat treatment depending upon the type of the insulating resin to be used.

Incidentally, the series of joining process mentioned above is carried out while the lead terminals 8 are being attached and fixed on the carrier tape. After the exterior 20 is formed, the ceramic electronic device 2 shown in FIG. 1 is obtained by cutting the connection portion of the pair of leg portions 8bc (i.e., the arc portion of the U shape) and detaching the lead terminals 8 from the carrier tape.

In the present embodiment, since the step surfaces 8c are formed on the lead terminals 8, the ceramic element body 4 can be joined while being stably temporarily held at a predetermined location of the lead terminals 8, and the soldering is easily carried out. That is, the lead terminals 8 and the ceramic element body 4 are easily positioned at the time of soldering, and the ceramic electronic device according to the present invention is suitable for mass production.

Figure 3B:
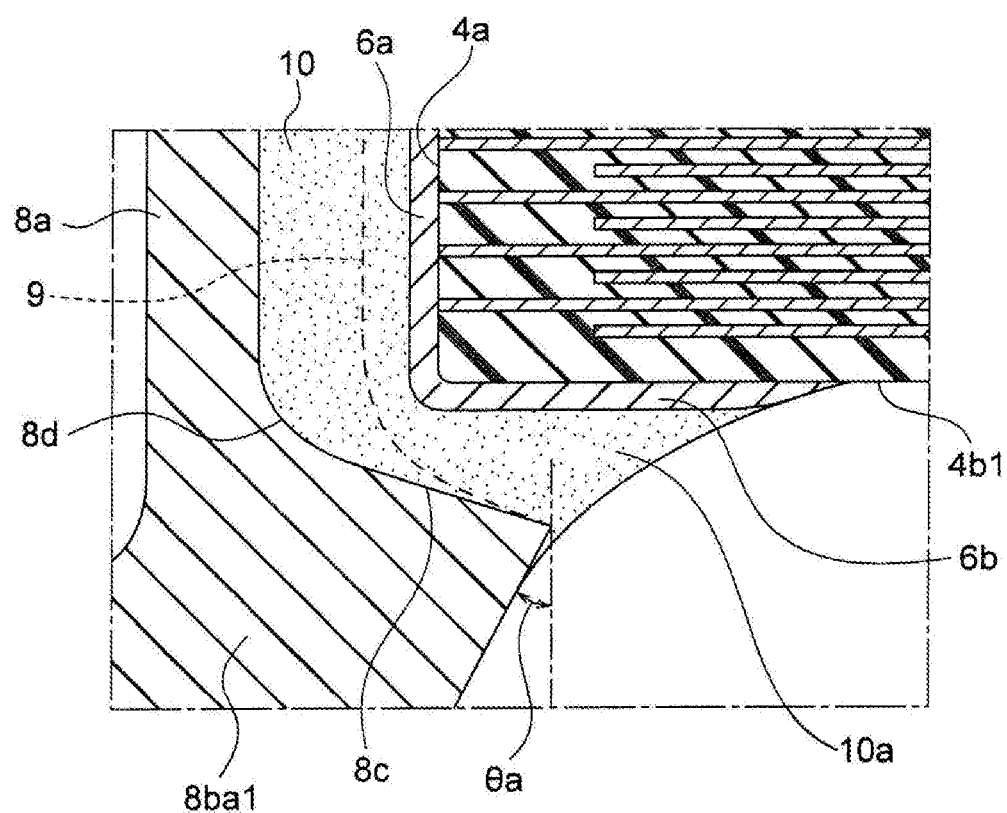
FIG. 3B is an enlarged cross-sectional view of a main part of FIG. 2B.
Figure 3C:
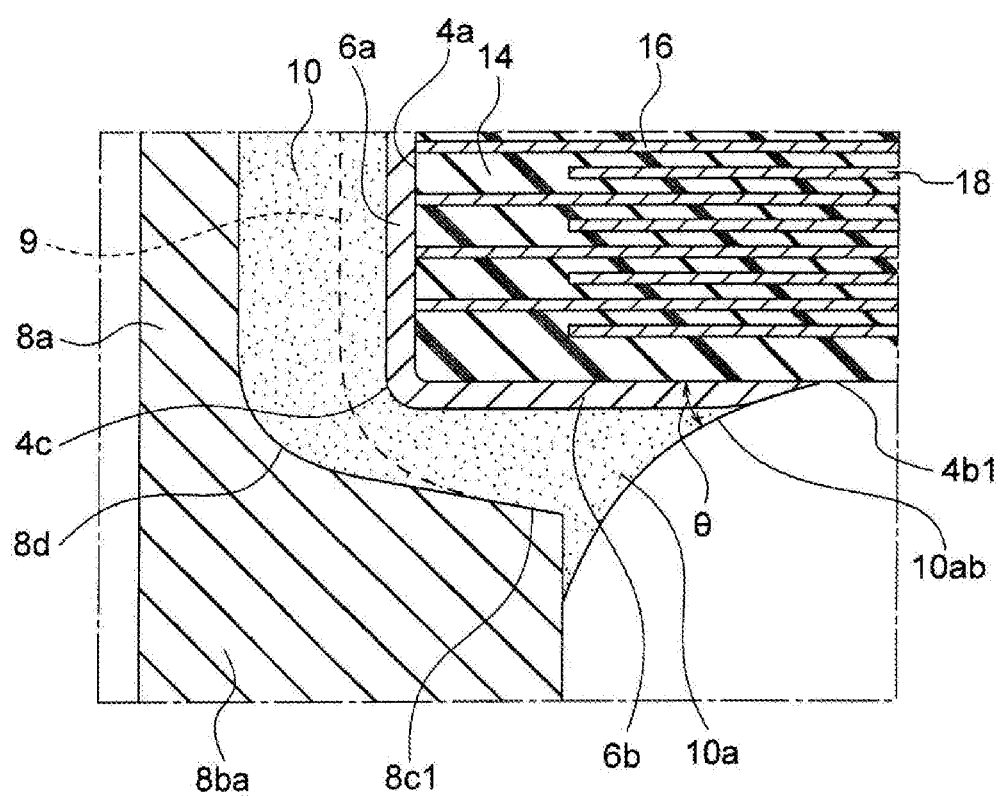
FIG. 3C is an enlarged cross-sectional view illustrating a modified example of the ceramic electronic device FIG. 2A.

Incidentally, FIG. 3A illustrates the step surface 8c as a parallel plane to the X-axis, but the step surface 8c may be an inclined surface 8c1 as shown in FIG. 3C or a curved surface. The inclined surface 8c1 shown in FIG. 3C is inclined along the roundness of the inner corner 8d.

Second Embodiment

Hereinafter, Second Embodiment of the present invention is explained based on FIG. 2B and FIG. 3B. Incidentally, the components of Second Embodiment common with those of First Embodiment are not explained and given similar references.

Figure 2B:
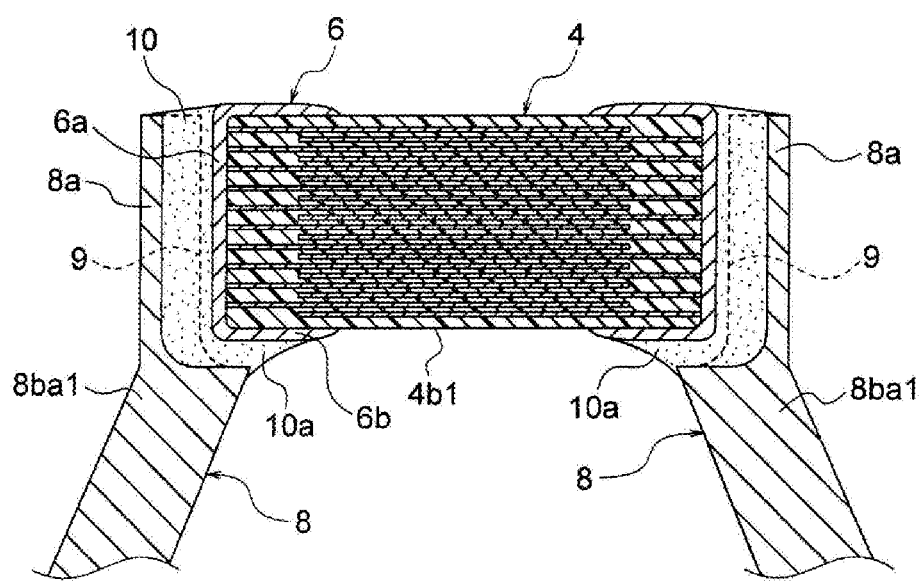
FIG. 2B is a cross-sectional view of a ceramic electronic device according to another embodiment of the present invention.
Figure 2B:
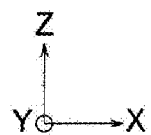

Also in Second Embodiment, as shown in FIG. 2B and FIG. 3B, the shapes of the electrode facing portions 8a of the lead terminals 8 are similar to those of First Embodiment, and the recesses 9 are formed on the facing surfaces 8aa. Thus, effects similar to those of First Embodiment are obtained in Second Embodiment.

In Second Embodiment, however, the upper support portion bends outward in the X-axis direction and constitutes a bent portion 8ba1. The outside in the X-axis direction is a direction where the pair of lead terminals is away from each other. Since the lead terminals 8 have the bent portions 8ba1, the angles θ of the fillets 10a are smaller. As a result, cracks generated in the ceramic element body 4 can more advantageously be restrained.

Specifically, the bent portions 8ba1 can have a bending angle θa of −10 degrees or more and 35 degrees or less (preferably, 5 degrees or more and 35 degrees or less) with respect to the Z-axis on the X-Z cross section shown in FIG. 3B. The larger the angle θa is, the smaller the angle θ of the fillet 10a tends to be. Incidentally, the bending angles θa of the bent portions 8ba1 are achieved in the surroundings of the step surfaces 8c. That is, the bent portions 8ba1 may have a curved shape gradually becoming parallel to the Z-axis as it goes downward in the Z-axis direction.

Third Embodiment

In Third Embodiment, modified examples of the tip shapes of the lead terminals 8 (particularly, the electrode facing portions 8a) are explained based on FIG. 4B to FIG. 4H. Incidentally, the components of Third Embodiment common with those of First Embodiment are not explained and given similar references.

Figure 4B:
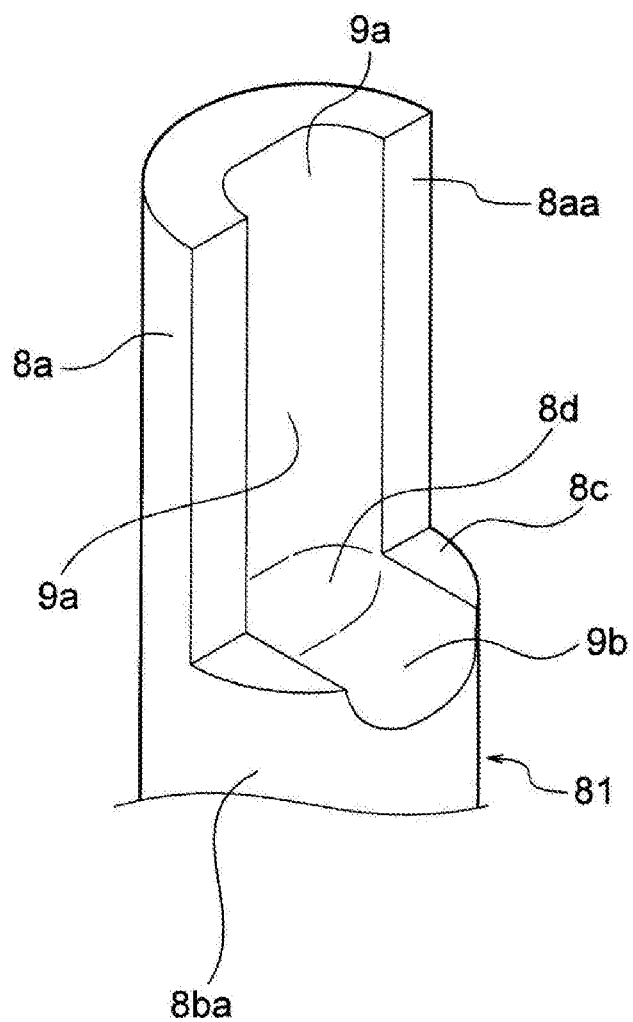
FIG. 4B is a schematic perspective view illustrating a modified example of a tip shape of a lead terminal.
Figure 4B:
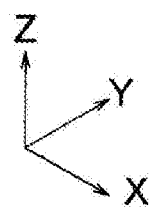

As with First Embodiment, a recess 9a extending in a parallel direction to the Z-axis is formed on the facing surface 8aa of a lead terminal 81 shown in FIG. 4B. In addition to the recess 9a, a recess 9b is formed on the step surface 8c of the lead terminal 81. The width in the Y-axis direction and depth of the recess 9b are similar to those of the recess 9a, but may be different from those of the recess 9a. Incidentally, the recess 9a and the recess 9b are communicated with each other.

Since the recess 9b is formed on the step surface 8c, the solder is further easy to flow toward the recess 9a at the time of soldering, and the angle θ of the fillet 10a can be smaller. As a result, the ceramic electronic device 2 including the lead terminals 81 shown in FIG. 4B can more effectively restrain cracks generated in the ceramic element body 4.

Figure 4C:
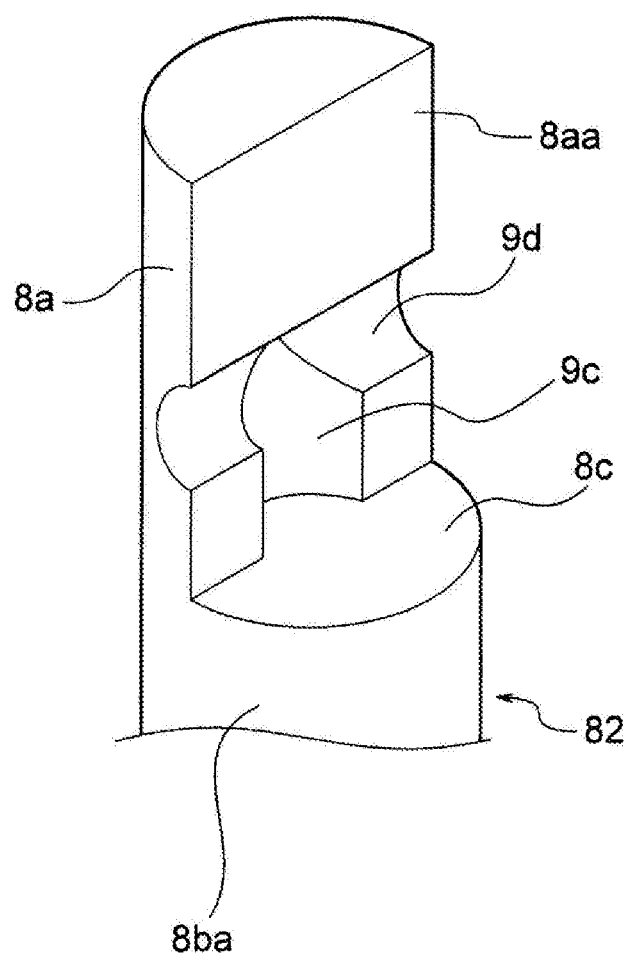
FIG. 4C is a schematic perspective view illustrating a modified example of a tip shape of a lead terminal.

Next, a lead terminal 82 shown in FIG. 4C is explained. A recess 9c extending in a parallel direction to the Z-axis is formed on the facing surface 8aa of the lead terminal 82. Then, a recess 9d parallel to the Y-axis is further formed on the lead terminal 82, and the recess 9c and the recess 9d are communicated with each other.

Specifically, the recess 9c exists from the lower end of the electrode facing portion 8a (i.e., above the step surface 8c) to the recess 9d. On the other hand, the recess 9d exists continuously from one lateral edge to the other lateral edge of the facing surface 8aa in the Y-axis direction. Incidentally, the lateral edges are edges of the facing surface 8aa parallel to the Z-axis.

During soldering, since the two recesses 9c and 9d are formed as shown in FIG. 4C, the recess 9c functions as a passage where the solder flows, and the solder also flows into the recess 9d. Thus, the molten solder existing between the lateral-surface electrode 6b and the lead terminal 81 (i.e., the location of the fillet 10a) easily goes between the electrode facing portion 8a and the end-surface electrode 6a. As a result, the ceramic electronic device 2 including the lead terminals 82 shown in FIG. 4C has a small angle θ of the fillet 10a and can more effectively restrain cracks generated in the ceramic element body 4.

Both of the recess 9c and the recess 9d of the lead terminal 82 are formed below the center of the facing surface 8aa. In particular, the recess 9d is open outside the electrode facing portion 8a at the lateral edge of the electrode facing portion 8a. Due to this structure, at the time of soldering, the molten metal flows from the recess 9c to the recess 9d and further flows from the recess 9d toward the outer circumference of the electrode facing portion 8a. As a result, the angle θ of the fillet 10a can be smaller, and the joint strength between the lead terminals 8 and the ceramic element body 4 is stronger.

Figure 4D:
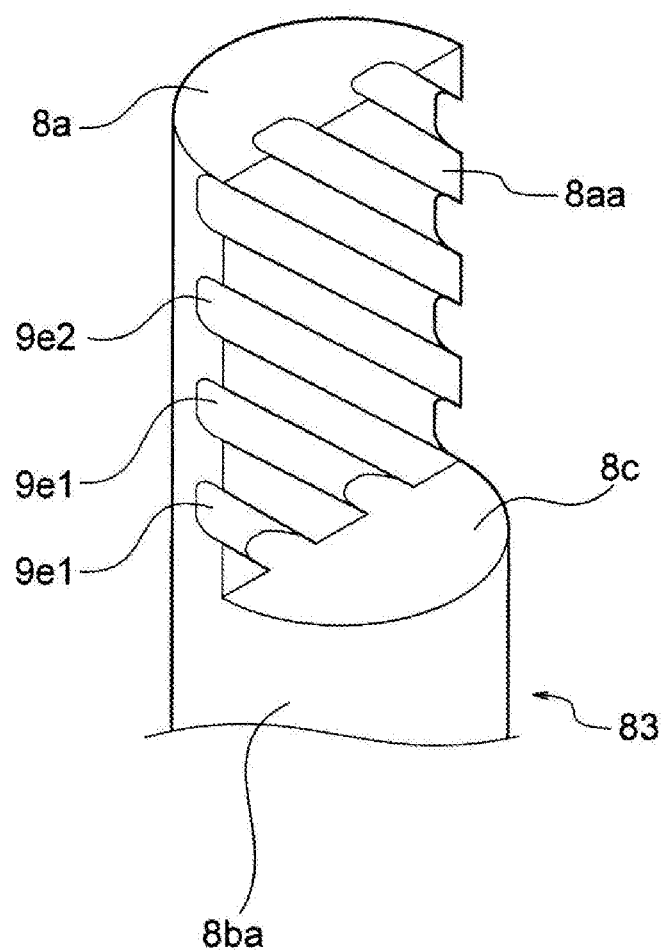
FIG. 4D is a schematic perspective view illustrating a modified example of a tip shape of a lead terminal.

Next, a lead terminal 83 shown in FIG. 4D is explained. The facing surface 8aa of the lead terminal 83 includes two recesses 9e1 and a plurality of recesses 9e2. The recesses 9e1 and the recesses 9e2 extend in a diagonal direction to the Z-axis (a direction diagonally intersecting the Y-axis). The two recesses 9e1 and the plurality of recesses 9e2 are substantially parallel to each other.

The two recesses 9e1 of the lead terminal 83 reach the step surface 8c and particularly effectively function as passages where the solder flows. In particular, the recesses 9e1 are open outside the electrode facing portion 8a at the lateral edge of the facing surface 8aa parallel to the Z-axis. Thus, the molten solder easily flows from the recesses 9e1 toward the outer circumference of the electrode facing portion 8a at the time of soldering. That is, the solder at the formation location of the fillet is easy to flow toward the recesses 9e1. As a result, the angle θ of the fillet 10a is smaller, and the joint strength between the lead terminals 8 and the ceramic element body 4 is stronger.

Incidentally, as with the other lead terminals 8 and 81-87, the tip shape of the lead terminal 83 as shown in FIG. 4D can be formed by arranging a plurality of projections on a pressing surface of a die to be used for squeezing. In the tip shape of the lead terminal 83, it is unnecessary to pay attention to a positional displacement between a conductive wire and a die at the time of pushing the die against the wire, and the manufacture is easily carried out.

Figure 4E:
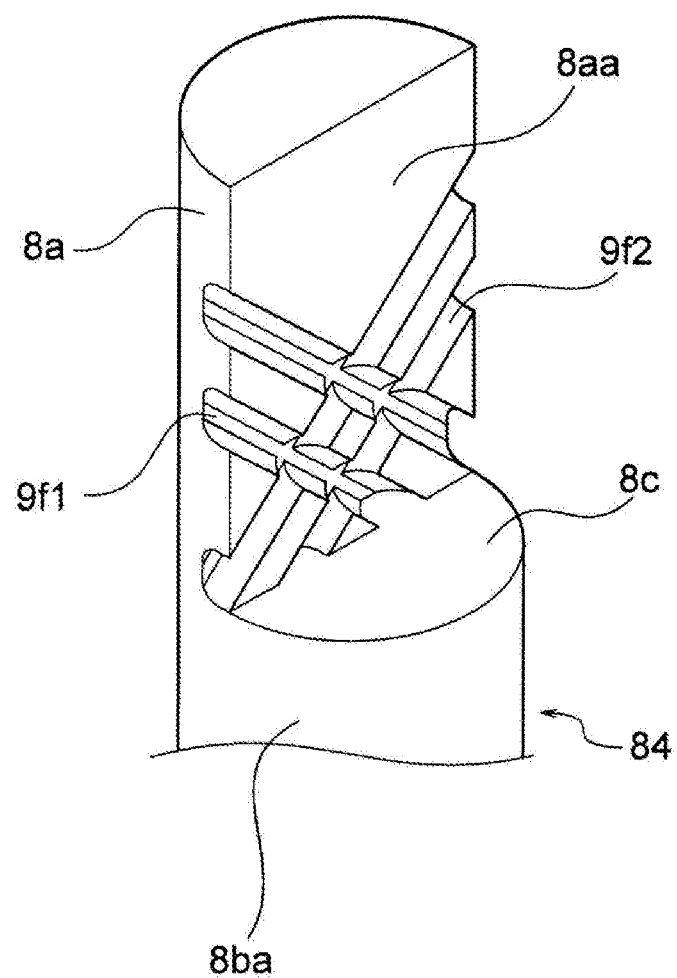
FIG. 4E is a schematic perspective view illustrating a modified example of a tip shape of a lead terminal.

In the lead terminal 83 shown in FIG. 4D, all of the two recesses 9e1 and the plurality of recesses 9e2 are substantially parallel to each other, but a plurality of recesses 9f may be formed to intersect each other like a lead terminal 84 shown in FIG. 4E. In case of using the lead terminal 84, effects similar to those of using the lead terminal 83 are obtained.

Figure 4F:
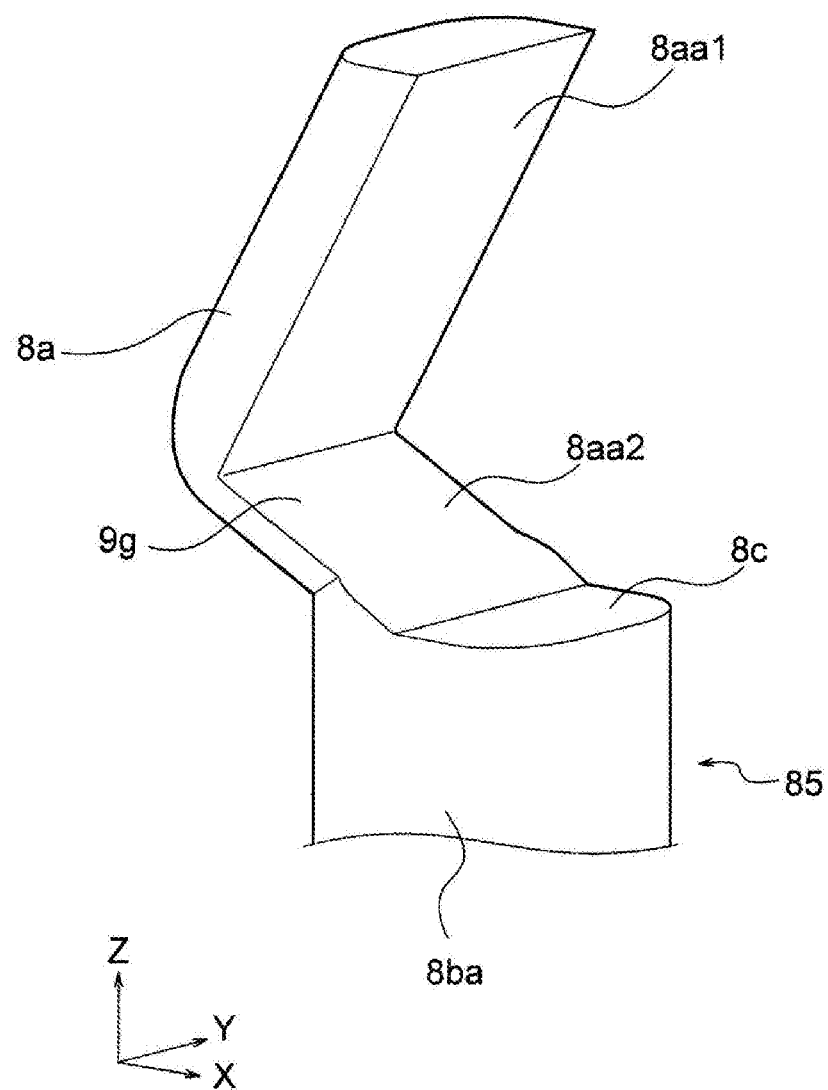
FIG. 4F is a schematic perspective view illustrating a modified example of a tip shape of a lead terminal.

Next, a lead terminal 85 shown in FIG. 4F is explained. The electrode facing portion 8a of the lead terminal 85 is bent. In particular, the upper end of the electrode facing portion 8a is inclined toward the end-surface electrode 6a, and the lower end of the electrode facing portion 8a is inclined from the step surface 8c toward the direction away from the end-surface electrode 6a.

Then, the electrode facing portion 8a of the lead terminal 85 includes two inclined surfaces 8aa1 and 8aa2 facing the end-surface electrode 6a. The inclined surface 8aa1 is located the upper end side of the electrode facing portion 8a, and the inclined surface 8aa2 is located the lower end side of the electrode facing portion 8a. The area of the inclined surface 8aa1 located on the upper end side is larger than that of the inclined surface 8aa2. The shape as shown in FIG. 4F can be achieved by devising the die shape at the time of squeezing. Instead, the tip of the conductive wire may be squeezed and thereafter bent.

In the lead terminal 85, a recess 9g is structured by the two inclined surfaces 8aa1 and 8aa2. In particular, the angle formed by the two inclined surfaces 8aa1 and 8aa2 is a central part of the recess 9g. The recess 9g can function as a passage where the solder flows at the time of soldering. In particular, the lead terminal 85 is configured so that the solder is greatly accumulated between the recess 9g and the end-surface electrode 6a. The recess 9g is open toward the outer circumference (lateral edge) of the electrode facing portion 8a. Thus, the molten solder existing between the lateral-surface electrode 6b and the lead terminal 85 easily goes toward the recess 9g at the time of soldering joint.

Incidentally, the angle formed by the two inclined surfaces 8aa1 and 8aa2 is preferably 90-150 degrees. In using the lead terminal 85, a larger space is formed between the lead terminal 85 and the terminal electrodes 6 compared to a normal terminal, and a larger amount of the solder 10 exists. That is, the solder joint portion is wide. In this case, the lead terminal 85 and the terminal electrode 6 are joined stronger, and the joint strength is improved.

Figure 4G:
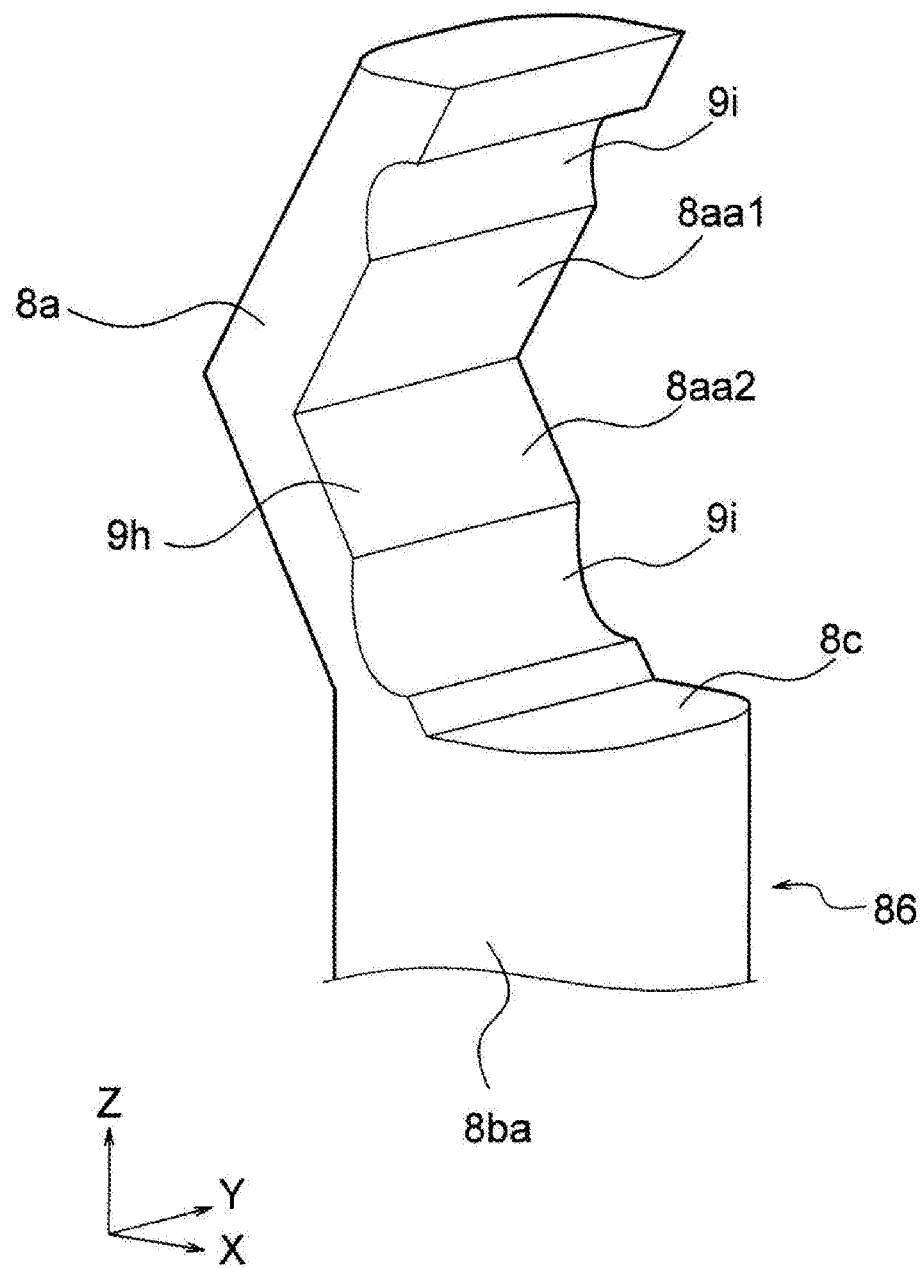
FIG. 4G is a schematic perspective view illustrating a modified example of a tip shape of a lead terminal.
Figure 4H:
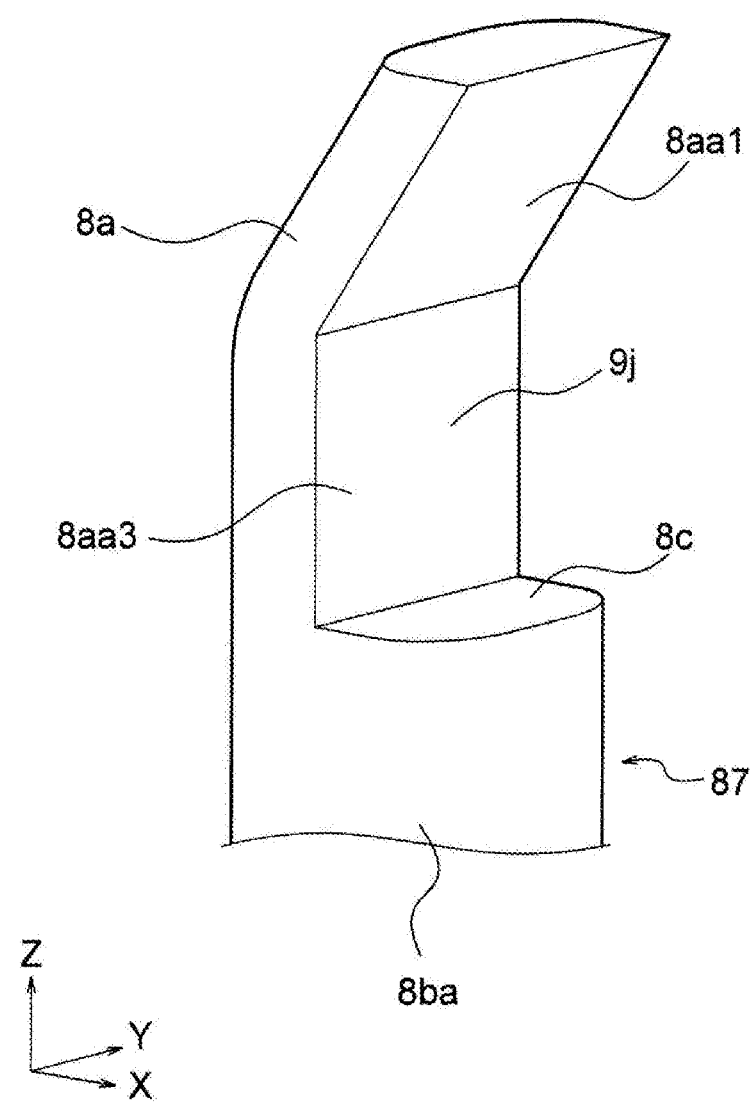
FIG. 4H is a schematic perspective view illustrating a modified example of a tip shape of a lead terminal.

When the electrode facing portion 8a is bent as shown in FIG. 4F, the tip shape of the lead terminal may be one as shown in FIG. 4G or FIG. 4H. In a lead terminal 86 shown in FIG. 4G, a recess 9i is formed on each of the two inclined surfaces 8aa1 and 8aa2. The lead terminal 86 includes a recess 9h structured by the two inclined surfaces 8aa1 and 8aa2. In the lead terminal 86, a central part of the recess 9h is located at a substantial center of the electrode facing portion 8a.

In a lead terminal 87 shown in FIG. 4H, the upper end of the electrode facing portion 8a is bent toward the end-surface electrode 6a, and the lower end of the electrode facing portion 8a is substantially parallel to the Z-axis. Thus, the electrode facing portion 8a of the lead terminal 87 includes the inclined surface 8aa1 and a surface 8aa3 substantially parallel to the end-surface electrode 6a. Also in the lead terminal 87, a recess 9j is structured by the inclined surface 8aa1 and the surface 8aa3. In this case, the center of the recess 9j means the center of the surface 8aa3.

Effects similar to those of the lead terminal 85 can also be expected in the lead terminal 86 of FIG. 4G and in the lead terminal 87 of FIG. 4H.

Fourth Embodiment

Hereinafter, Fourth Embodiment of the present invention is explained based on FIG. 5 and FIG. 6. Incidentally, the components of Fourth Embodiment common with those of First to Third Embodiments are not explained and given similar references.

In the ceramic electronic device 2, as mentioned in First Embodiment, the terminal electrodes 6 of the ceramic element body 4 is joined with a pair of lead terminals 8. The pair of lead terminals may be structured so that the tip shapes (i.e., the shapes of the electrode facing portions 8a) are different from each other. Fourth Embodiment illustrates an example in which the ceramic electronic device is structured by two lead terminals whose tip shapes are different from each other.

Figure 5:
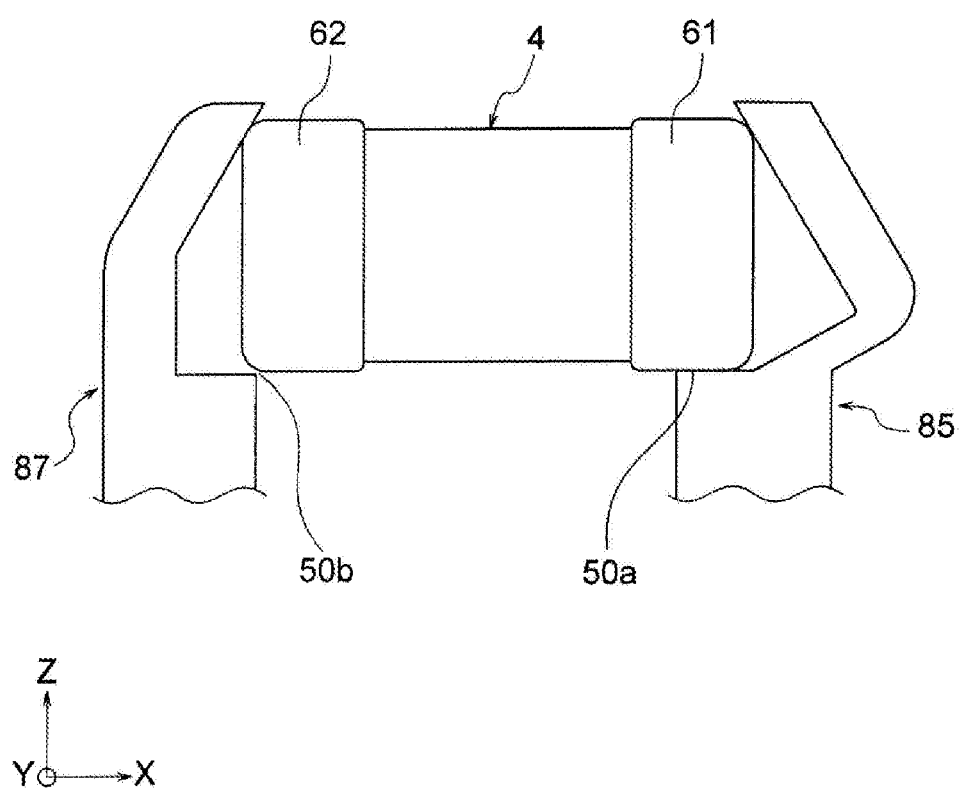
FIG. 5 is a brief front view illustrating a ceramic electronic device according to another embodiment of the present invention.

FIG. 5 illustrates an embodiment where the ceramic element body 4 is temporarily fixed by a pair of lead terminals before soldering. A terminal electrode 61 located on the right side in the X-axis direction is joined with the lead terminal 85 shown in FIG. 4F, and a terminal electrode 62 located on the other side is joined with the lead terminal 87 shown in FIG. 4H. In the combination between the lead terminals 85 and 87, the ceramic element body 4 is fixed by three-point support. That is, the ceramic element body 4 is supported by three points of the upper end of the lead terminal 85, the step surface 8c of the lead terminal 85, and the upper end of the lead terminal 87 in a temporarily fixed state.

When the ceramic element body 4 is temporarily fixed by three-point support, the ceramic element body 4 is fixed by the two lead terminals 85 and 87 in a more stable state, and the location of the ceramic element body can be prevented from deviating during transportation or so. As a result, the lead terminals 85 and 87 and the terminal electrodes 61 and 62 of the ceramic element body 4 are joined strongly, and the reliability of the electronic device is improved.

In Fourth Embodiment, a gap 50a exists between a bottom surface 4d1 of the ceramic element body 4 and the step surface 8c of the lead terminal 85, and a gap 50b exists between a bottom surface 4d1 of the ceramic element body 4 and the step surface 8c of the lead terminal 87. Comparing the width between the gap 50a and the gap 50b, the gap 50b is wider. Since the gap 50b is wider than the gap 50a, cracks generated in the ceramic element body 4 is more effectively restrained.

Figure 6:
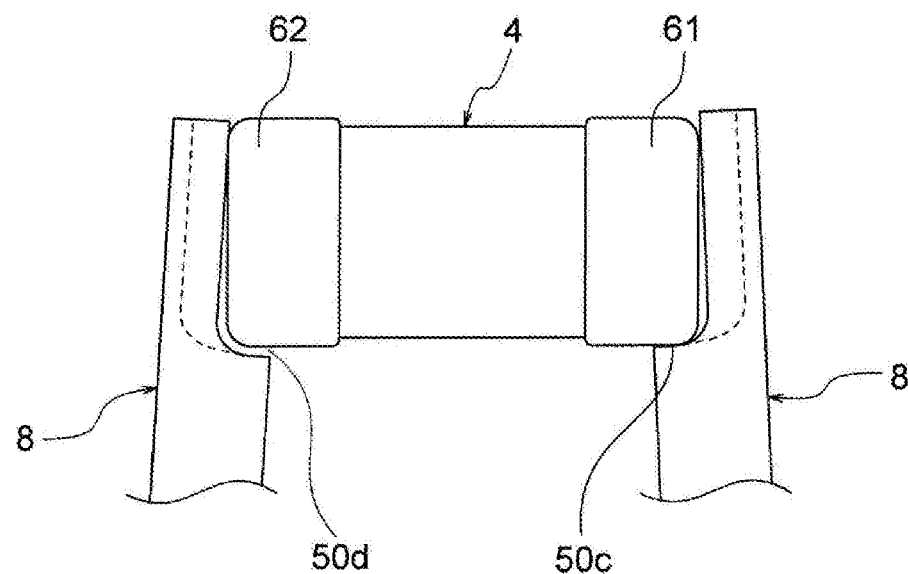
FIG. 6 is a brief front view illustrating a ceramic electronic device according to another embodiment of the present invention.
Figure 6:
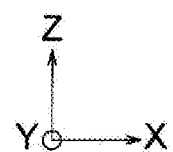

Incidentally, the above-mentioned fixture by three-point support can also be achieved by using the lead terminals 8 whose tip shapes are the same as shown in FIG. 6. In FIG. 6, as for gaps 50c and 50d between the bottom surface 4b1 and the lead terminals 8, the gap 50d is wider than the gap 50c.

Hereinbefore, embodiments of the present invention are explained, but the present invention is not limited to the above-mentioned embodiments and may variously be modified within the scope of the present invention. For example, the above-mentioned embodiments explain a case where the ceramic element body 4 is a multilayer ceramic capacitor, but in addition to capacitors, the ceramic electronic device may be a varistor, a piezoelectric element, a filter, a chip bead, an inductor, a thermistor, etc. In case of these electronic devices, the ceramic layers 14 are structured by piezoelectric ceramics, semiconductor ceramics, magnetic ceramics, etc.

In the above-mentioned embodiments, the lead terminals have a semicircular shape on the X-Y cross section as a whole, but may have a rectangular shape or an oval shape. That is, a squeezed surface may also be formed on the other side of the facing surface 8aa of the electrode facing portion 8a. Then, a recess may also be formed on the other surface of the facing surface 8aa.

In FIG. 1 and FIG. 2A, the lower support portion 8bb, which functions as a kink, is bent in a direction where the pair of lead terminals 8 is away from each other in the X-axis, but may be bent in a direction where the pair of lead terminals 8 approaches each other in the X-axis or may have a S-shaped curved shape.

EXAMPLES

Example 1

In Example 1, 20 multilayer ceramic capacitors were manufactured using lead terminals 8 having the tip shape shown in FIG. 4A, and an angle θ of a fillet 10*a* and a crack incidence of each sample were evaluated.

Specifically, the lead terminals 8 of Example 1 were a Cu wire where a tin plating layer was formed on the surface or a CP wire where a tin plating layer was formed on the surface. Then, evaluation samples were manufactured by the method shown in First Embodiment. That is, only the tips of the lead terminals 8 of Example 1 were immersed into a solder bath (immersion step), and an alloy layer containing copper and tin was formed on the surfaces of the lead terminals 8 contacted with the solder. The sizes of the manufactured capacitor chips were 1.6 mm (length)×0.8 mm (width)×0.8 mm (height).

(Measurement of Angle θ of Fillet 10*a*)

The angle θ of the fillet 10*a* was measured by image analysis of a SEM cross-sectional picture. A sample for SEM observation was obtained by cutting an X-Z cross section at the center of the lead terminals 8 in the Y-axis direction and subjecting the cross section to mirror polishing.

(Crack Evaluation)

In the above-mentioned SEM observation, whether or not cracks existed inside the ceramic element body 4 (particularly, the surroundings of the fillet 10 of the ceramic element body 4) was examined. The crack examination was carried out at two points of 20 electronic device samples (i.e., 40 points in total were examined), and a rate in which cracks were generated (a crack incidence) was calculated.

As a result of the above-mentioned evaluation, in case of the Cu wire of Example 1, the fillet angle θ was 37.6 degrees on average, and the crack incidence was 12.5%. In case of the CP wire of Example 1, the fillet angle θ was 36.3 degrees on average, and the crack incidence was 7.5%.

Example 2

In Example 2, the tips of the lead terminals were processed into the shape shown in FIG. 4C, and samples of multilayer ceramic capacitors were manufactured as with Example 1. In Example 2, an immersion step was also carried out before soldering, and an alloy layer containing copper and tin was formed on the surfaces of the lead terminals contacted with the solder.

In Example 2, a similar evaluation to Example 1 was carried out. In case of the Cu wire, the fillet angle θ was 31.3 degrees on average, and the crack incidence was 5.0%. In case of the CP wire, the fillet angle θ was 30.5 degrees on average, and the crack incidence was 5.0%.

Comparative Example

As a comparative example, a sample of multilayer ceramic capacitor was manufactured using lead terminals in which no recesses were formed on an electrode facing portion 8*a*. In the manufacture of the comparative example sample, no immersion step was carried out, and no alloy layer containing copper and tin was formed on the surfaces of the lead terminals. The conditions other than the above were common with Example 1.

In Comparative Example, when the Cu wire was used, the fillet angle θ was 73 degrees on average, and the crack incidence was 40.0%. When the CP wire was used, the fillet angle θ was 60.9 degrees on average, and the crack incidence was 47.5%.

As shown in the embodiments, the results of Examples 1 and 2 and Comparative Example confirmed that forming the recess on the electrode facing portion 8*a* reduced the fillet angle θ and was able to restrain cracks generated inside the ceramic element body 4.

DESCRIPTION OF THE REFERENCE NUMERICAL

2 . . . ceramic electronic device
4 . . . ceramic element body
   4*a* . . . end surface
   4*b* . . . lateral surface
      4*b*1 . . . bottom surface
   4*c* . . . outer corner
6 . . . terminal electrode
   6*a* . . . end-surface electrode
   6*b* . . . lateral-surface electrode
8 . . . lead terminal
   8*a* . . . electrode facing portion
      8*aa* . . . facing surface
   8*b* . . . extension portion
      8*ba* . . . upper support portion
      8*bb* . . . lower support portion (kink)
      8*bc* . . . leg portion (board mounting portion)
   8*c* . . . step surface
   8*d* . . . inner corner
9, 9*a*-9*j* . . . recess
10 . . . solder
   10*a* . . . fillet
      10*ab* . . . outer periphery of fillet
20 . . . exterior

What is claimed is:

1. A ceramic electronic device comprising:
    a ceramic element body having an end surface and a lateral surface;
    a terminal electrode formed on from the end surface to a part of the lateral surface of the ceramic element body; and
    a lead terminal connected to the terminal electrode by a connection member,
    wherein
    the lead terminal includes:
        an electrode facing portion disposed correspondingly to an end-surface electrode of the terminal electrode;
        an extension portion extending downward from a lower end of the electrode facing portion; and
        a step surface located between the electrode facing portion and the extension portion,
    the electrode facing portion has a first recess facing the terminal electrode;
    a part of the first recess reaches the step surface; and
    another part of the first recess is open outside the lead terminal.

2. The ceramic electronic device according to claim 1, wherein
    an upper end of the electrode facing portion is inclined toward the terminal electrode,
    the electrode facing portion has at least one inclined surface, and
    the inclined surface constitutes the first recess.

3. The ceramic electronic device according to claim 1, wherein the electrode facing portion has a facing surface facing the end-surface electrode of the terminal electrode, and the first recess is formed on the facing surface.

4. The ceramic electronic device according to claim 3, wherein a second recess extending in a direction intersecting the first recess is further formed on the electrode facing portion, and the first recess and the second recess are communicated with each other.

5. The ceramic electronic device according to claim 1, wherein a third recess is formed on the step surface, and the first recess and the third recess of the step surface are communicated with each other.

6. The ceramic electronic device according to claim 1, wherein another part of the first recess is open outside at a lateral edge of the electrode facing portion.

7. The ceramic electronic device according to claim 1, wherein the extension portion of the lead terminal has a bent portion bending outward from below the step surface.

8. The ceramic electronic device according to claim 1, wherein the connection member is a solder, and an alloy layer containing copper and tin is formed on a surface of the lead terminal contacted with the solder.

9. The ceramic electronic device according to claim 1, wherein a fillet of a solder of the connection member is formed between the lateral surface of the ceramic element body and the lead terminal, and the fillet has an angle of 40 degrees or less.

10. A ceramic electronic device comprising:

a ceramic electronic body having two end surfaces opposing each other and a lateral surface connecting the two end surfaces;

a pair of terminal electrodes formed respectively on the two end surfaces; and a first lead terminal and a second lead terminal respectively connected to the pair of terminal electrodes, wherein each of the first lead terminal and the second lead terminal includes:

an electrode facing portion disposed correspondingly to an end-surface electrode of the terminal electrode;

an extension portion extending downward from a lower end of the electrode facing portion; and a step surface located between the electrode facing portion and the extension portion, each of the electrode facing portions has a first recess facing the terminal electrode, a part of the first recess reaches the step surface, and another part of the first recess is open outside the lead terminal.

11. The ceramic electronic device according to claim 10, wherein the electrode facing portions of the first lead terminal and the second lead terminal have different shapes.

12. The ceramic electronic device according to claim 10, wherein a gap between the step surface of the first lead terminal and the lateral surface of the ceramic element body is wider than that between the step surface of the second lead terminal and the lateral surface of the ceramic element body.

\* \* \* \* \*